(12) United States Patent
Todd et al.

(10) Patent No.: X8960
(45) Date of Patent: Jul. 7, 1835

(54) OIL, LINSEED, SUBSTITUTE FOR

(76) Inventors: Seth I. Todd; Joseph L. Peabody

Seth I. Todd and Joseph L Peabody. of Washington District of Columbia

Letters Patent.

The schedule referred to in these Letters Patent and making part of the same containing a description in the words of the said Seth I. Todd and Joseph L. Peabody themselves of their improvement being a substitute for Linseed Oil and its application to painting To all whom it may concern Be it known that we Seth I Todd and Joseph L. Peabody of the City of Washington in the District of Columbia, have invented or discovered, a new and useful composition of matter to be used as a substitute for Linseed Oil in its application to house, ship, and other kinds of Painting, and we do hereby declare that the following is a full and exact description of our said invention or discovery. We take either, whale, cotton seed or some other of the cheaper kinds of animal or vegetable oil which we combine with caoutchouc or india rubber held in solution by Spirits of Turpentine. The proportions which we have generally employed in the experiments already made by us, are these. we dissolve one ounce of Caoutchouc in one gallon of the Spirits of Turpentine, to which solution we add two gallons of the oil to be used. We do not indicate these proportions, however as those which are strictly to be adhered to, as they may be advantageously varied, and that to a considerable extent, according to the nature of the oil employed, the kind of work to be performed and the suggestions of further experience. The solution caoutchouc may be made either in Spirits of Turpentine, or in any other of the known solvents of that substance: We are aware that the inferior oils have been heretofore rendered drying by modes of treatment adapted to that end. even that they have been combined with spirits of turpentine and used in the process of painting, and to such mixtures and processes we do not therefore make any claim as constituting any part of our invention, but what we do claim is the addition to such mixtures of a portion of caoutchouc in solution, by which they are greatly improved, and more perfectly adapted to the purposes of the painter. We claim no more.

Witnesses
Walter Harper
G. W. Stephenson

Seth I. Todd
J. L. Peabody

405 [illegible]

Exd
ChM.